(12) United States Patent
Blencoe et al.

(10) Patent No.: US 12,091,727 B2
(45) Date of Patent: Sep. 17, 2024

(54) PROCESS FOR EXTRACTING LITHIUM, ALUMINUM, AND SILICON MATERIALS FROM A HARD ROCK SOURCE

(71) Applicants: James G. Blencoe, Fernandina Beach, FL (US); Arend Groen, Kingston, TN (US)

(72) Inventors: James G. Blencoe, Fernandina Beach, FL (US); Arend Groen, Kingston, TN (US)

(*) Notice: Subject to any disclaimer, the term of this patent is extended or adjusted under 35 U.S.C. 154(b) by 0 days.

(21) Appl. No.: 18/375,341

(22) Filed: Sep. 29, 2023

(65) Prior Publication Data

US 2024/0132991 A1 Apr. 25, 2024

Related U.S. Application Data

(60) Provisional application No. 63/412,029, filed on Sep. 30, 2022.

(51) Int. Cl.
*C22B 3/06* (2006.01)
*C01D 15/02* (2006.01)
(Continued)

(52) U.S. Cl.
CPC .............. *C22B 3/065* (2013.01); *C01D 15/02* (2013.01); *C01F 5/38* (2013.01); *C22B 21/0007* (2013.01); *C22B 21/0015* (2013.01); *C22B 26/12* (2013.01)

(58) Field of Classification Search
None
See application file for complete search history.

(56) References Cited

U.S. PATENT DOCUMENTS 10,883,156 B2   1/2021 Hunwick
2017/0175228 A1* 6/2017 Hunwick ............... C01D 15/08
(Continued)

FOREIGN PATENT DOCUMENTS

AU   2021106011 A4   10/2021
CA      3009374 A1    6/2017
(Continued)

OTHER PUBLICATIONS

English translation of CN-114318008-A Description (Year: 2022).*
(Continued)

*Primary Examiner* — Anthony J Zimmer
*Assistant Examiner* — Syed T Iqbal
(74) *Attorney, Agent, or Firm* — Romulo H. Delmendo; Jeanette M. Braun; Braun IP Law, LLC

(57) ABSTRACT

An improved beta(β)-spodumene (~LiAlSi$_2$O$_6$) nitric acid conversion process produces discrete lithium (Li), aluminum (Al) and silica (SiO$_2$) materials by: (i) converting lithium nitrate, LiNO$_3$, to lithium carbonate, Li$_2$CO$_3$; (ii) creating a Al-rich precipitate either by thermally decomposing aluminum nitrate, Al(NO$_3$)$_3$, or by reacting Al(NO$_3$)$_3$ with aqueous and/or solid ammonium carbonate, (NH$_4$)$_2$CO$_3$; and (iii) forming a solid SiO$_2$-rich aluminosilicate residue by selectively leaching Li and Al from β-spodumene. Three key reactants consumed during processing—nitric acid (HNO$_3$), ammonia (NH$_3$), and magnesium oxide (MgO)—may be regenerated internally by closed-loop chemical cycles, this feature of the process greatly improving its economics in commercial applications.

31 Claims, 3 Drawing Sheets

(51) Int. Cl.
    *C01F 5/38*     (2006.01)
    *C22B 21/00*     (2006.01)
    *C22B 26/12*     (2006.01)

(56) References Cited

U.S. PATENT DOCUMENTS

| | | |
|---|---|---|
| 2021/0387860 A1 | 12/2021 | Hunwick |
| 2022/0364203 A1 | 11/2022 | Park et al. |

FOREIGN PATENT DOCUMENTS

| | | | | |
|---|---|---|---|---|
| CN | 1024124 | C | * | 4/1994 |
| CN | 106906359 | A | | 6/2017 |
| CN | 108277367 | A | * | 7/2018 |
| CN | 113603122 | A | * | 11/2021 |
| CN | 114318008 | A | * | 4/2022 |
| CN | 115321563 | A | | 11/2022 |
| CN | 115537580 | A | | 12/2022 |
| EP | 3859020 | A1 | | 8/2021 |
| WO | 2017106925 | A1 | | 6/2017 |
| WO | 2021146768 | A1 | | 7/2021 |
| WO | WO-2021168210 | A1 | * | 8/2021 ............ C01D 15/08 |
| WO | 2023133608 | A1 | | 7/2023 |

OTHER PUBLICATIONS

English translation of CN-113603122-A Description (Year: 2021).*
English translation of CN-108277367-A Description (Year: 2018).*
English translation of CN-1024124-C Description (Year: 1994).*
Leni, B. The lithium supply and demand story, 2017, https://www.mining.com/web/lithium-supply-demand-story/ (accessed electronically on Dec. 21, 2023). (Year: 2017).*
Gao et al., "Lithium extraction from hard rock lithium ores (spodumene, lepidolite, zinnwaldite,petalite): Technology, resources, environment and cost," 6 China Geology 137-53 (2023).
Takei, "Electrolytic deposition of lithium from non-aqueous solutions," 9 J. Appl. Electrochem 587-93 (1979).
PCT Search Report and Written Opinion Mailed Jan. 19, 2024 in PCT/US2023/034249 filed Sep. 30, 2023.
Alena Federockova et al., "Simplified Waste-Free Process for Synthesis of Nanoporous Compact Alumina Under Technologically Advantageous Conditions," 10 RSC. ADV. 32423-32435 (2020).
PCTUS2421545—ISA Search Report and Opinion (May 31, 2024).

* cited by examiner

PROCESS FOR EXTRACTING LITHIUM, ALUMINUM, AND SILICON MATERIALS FROM A HARD ROCK SOURCE

CROSS-REFERENCE TO RELATED APPLICATION

This non-provisional application claims priority to U.S. Provisional Application 63/412,029, filed Sep. 30, 2022, which is incorporated herein by reference in its entirety.

FIELD OF THE INVENTION

The present invention relates generally to a process for extracting lithium, aluminum, and silicon materials from a hard-rock source that includes spodumene concentrate.

STATEMENT REGARDING FEDERALLY-SPONSORED RESEARCH OR DEVELOPMENT

None.

BACKGROUND OF THE INVENTION

Lithium (Li), aluminum (Al) and silicon (Si) materials, when recovered from sources in the Earth's crust and processed, are vital in numerous commercial applications. In the case of lithium and its compounds, the most common uses are in manufacturing lithium-ion batteries, lubricants, and glass ceramics, and in forming Li alloys with Al and magnesium (Mg). Aluminum and its compounds also have many different uses, such as, in the case of aluminum oxide, alumina ($Al_2O_3$): as a source of Al for manufacturing metallic Al, Al alloys, and glass ceramics; as an abrasive; and as a catalyst support. As for silicon, its common oxide, silica ($SiO_2$), is used to make, for example, glass ceramics, silica-based glass optical fibers, fiberglass, precipitated silica, and silica gel.

Specifically with respect to lithium materials, the ever-increasing need for higher capacity and more long-lasting lithium batteries has fueled demand for lithium carbonate ($Li_2CO_3$) and lithium hydroxide monohydrate ($LiOH \cdot H_2O$). In response to this development, brine deposits in South America (mostly in Chile and Argentina) have become major sources of Li materials, especially $Li_2CO_3$. Concurrently, Li extraction from Li-containing silicate minerals has increased sharply, most notably from the mineral spodumene (in its purest form, $LiAlSi_2O_6$).

Regarding extraction of Li from spodumene, representative documents reflective of the state of the art include, e.g., US 2017/0175228 A1 (Hunwick) published Jun. 22, 2017, which describes a process comprising a thermal treatment unit configured to operate at a temperature that converts previously leached lithium material to solid lithium oxide ($Li_2O$). The thermal treatment unit may comprise a roaster. The thermal treatment may also employ indirect heating of the extracted lithium material, which may be lithium nitrate ($LiNO_3$). In the case of the lithium material being $LiNO_3$, indirect heating may comprise the catalyzed burning of ammonia ($NH_3$) in an excess of air. A stream of gas produced by thermal treatment may be collected for reuse in the acid leach and/or for regenerating nitric acid. The reference states that in the acid leach, the silicate mineral may be mixed with nitric acid. In an embodiment described as a sidestream treatment regime, the reference teaches that ammonium carbonate (($NH_4$)$_2CO_3$) may be used to precipitate the lithium values as lithium carbonate. The reference also states that the leach conditions may comprise increased temperature and/or pressure to accelerate extraction of lithium values from the silicate mineral as lithium nitrates, but with non-lithium values in the silicate mineral tending not to be leached from the silicate mineral. As will become apparent from the text below, conditions tending to prevent leaching of non-lithium values are contrary to what occurs in the present invention.

Another reference, namely CA 3 009 374 A1 (Hunwick), published Jun. 29, 2017, discloses a process for recovering lithium from a silicate mineral, the process comprising: (a) mixing the silicate mineral with nitric acid; (b) subjecting a mixture obtained from step (a) to a leaching process having conditions such that lithium values in the silicate mineral are leached into an aqueous phase as $LiNO_3$; (c) separating the $LiNO_3$ from the aqueous phase; (d) subjecting the separated $LiNO_3$ obtained from step (c) to a thermal treatment at a temperature that causes decomposition of the $LiNO_3$ into solid lithium oxide, and such that a gas stream that comprises oxides of nitrogen is produced; and (e) passing the gas stream comprising oxides of nitrogen to a nitric acid production stage in which nitric acid is formed for reuse in the leaching process.

Furthermore, CN106906359A (ICSIP Pty Ltd.), published Jun. 30, 2017, discloses a process for recovering lithium from silicate minerals in which, in an embodiment described as a sidestream treatment regime, lithium may be precipitated as lithium carbonate using ammonium carbonate.

Additionally, CN113603122A (Hunan Tiantai Tianrun New Energy Technology Co. Ltd.), published Nov. 5, 2021, discloses a method for synthesizing battery-grade lithium carbonate, which specifically includes the following steps: S1: Pretreatment: after discharging, disassembling, and crushing the recycled waste lithium iron phosphate battery, electrode powder is obtained; S2: Nitration reaction: the above electrode powder is added to the nitric acid solution for nitration reaction, the liquid-solid ratio is 4:1, and the nitrate product is obtained after the reaction; S3: roasting: roasting the above nitrate product to obtain calcine; S4: Leaching: leaching the calcine with water, with a solid-liquid ratio of 1:2, and filtering to obtain a lithium-rich solution; S5: Preparation of battery-grade lithium carbonate: adding carbonate (e.g., ammonium carbonate) to a lithium-rich solution at 50° C. while stirring. The reference states that after reacting, filtering and washing, drying, sieving, and packaging, battery-grade lithium carbonate is obtained.

CN115537580A (Jiangxi Shanning Technology Co. Ltd.), published Dec. 30, 2022 (which is after the priority date of the present application), discloses a method for extracting lithium in lithium ore, comprising the steps of: 1) after mixing lithium ore with saltpeter, ball milling, roasting, acid leaching, and filtering, lithium-containing solution and silicon-rich slag are obtained; 2) precipitating lithium after mixing the lithium-containing solution and carbonate (e.g., ammonium carbonate) to obtain a lithium-containing compound; wherein, the lithium ore is selected from "at least two kinds of spodumene, lepidolite, and lithium china stone." In a preferred embodiment, the precipitation is described as being conducted at 85-100° C.

Furthermore, CN1024124C (Xinjiang Non-Ferrous Metal Inst.), published Apr. 6, 1994 discloses a method for making quilonum retard involving, among other steps, using a ammonium carbonate precipitating agent to obtain lithium carbonate from a sulfate solution containing lithium.

SUMMARY OF THE INVENTION

The present invention, described below by way of non-limiting aspects, embodiments, or examples, is directed to an improved process for co-producing lithium, aluminum, and silicon materials, and more particularly, to a process for extracting and co-producing lithium, aluminum, and silicon materials from a hard-rock source in the form of a granular concentrate of one or more lithium-containing, aluminosilicate minerals, including spodumene (~$LiAlSi_2O_6$). One of the features of the invention resides in the implementation of a technique involving: (i) a thermal treatment in a reactor, such as a sealed mixing reactor, at a temperature sufficient to decompose $Al(NO_3)_3$ in an aqueous mixture, described further below, to form a Al-rich precipitate ("$Al(OH)_3$") that contains abundant amorphous Al—O—H solid material mixed with other amounts of quasi-crystalline Al—O—H phases; or alternatively (ii) contacting an aqueous mixture with sufficient aqueous and/or solid ammonium carbonate (($NH_4)_2CO_3$), this causing precipitation of $Al(OH)_3$.

In one aspect of the invention, a process for extracting lithium, aluminum, and silicon materials from a hard-rock source in the form of a granular concentrate of one or more lithium-containing aluminosilicate minerals—including spodumene—is disclosed. The process may comprise at least the steps of:

providing a hard-rock source in the form of a granular concentrate of one or more lithium-containing aluminosilicate minerals that include spodumene (Step 1);

calcining the concentrate of Step 1 at an elevated temperature sufficient to convert substantially all of the spodumene therein from its natural alpha (α) polymorphic crystal structure to a synthetic beta (β) crystal structure (Step 2);

providing an aqueous solution of nitric acid ($HNO_3$) (Step 3);

mixing the minerals from Step 2 with the aqueous solution of nitric acid ($HNO_3$), and subjecting the resulting mixture to conditions sufficient to effect leaching of lithium (Li) and aluminum (Al) from the β-spodumene in the concentrate of Step 1, and possibly also from one or more other minerals in that concentrate, in a first primary sealed mixing reactor (Step 4) and, optionally, further leaching the calcined concentrate with nitric acid in one or more secondary sealed mixing reactors (optional Step 5);

transferring the slurry from the first primary sealed mixing reactor, or from the one or more optional secondary sealed mixing reactors, to a second primary sealed mixing reactor with a lower gas pressure to reduce the pressure of the transferred slurry, this resulting in the production of N—O—H gas from the transferred slurry (Step 6); removing the slurry from the second primary sealed mixing reactor and allowing the slurry to cool down (Step 7);

separating the cooled slurry into two fractions, where one fraction is rich in leached granular β-spodumene, and the other fraction is a liquid containing a relatively small amount of entrained or suspended solid material, the leached granular β-spodumene-rich fraction being transferred to a mixer where it is washed with high-purity water, and then optionally, and separately, contacted with an aqueous solution of Na and/or K hydroxide under conditions sufficient to dissolve Li, Al, and $SiO_2$, and finally subjected to further processing to recover: (i) Li as one or more of $Li_2CO_3$, LiOH(aq), LiOH·$xH_2O$ (where x=1, 2, 3, or 6), and/or $Li_2O·ySiO_2$ (where y=1 or 2); (ii) Al as one or more of $Al(OH)_3$, $Al_2O_3·H_2O$, and $Al_2O_3$; and (iii) $SiO_2$ as either retained in $(Na,K)_2SiO_3$(aq), and/or as precipitated silica and/or silica gel (Step 8); and combining the $LiNO_3$(aq)- and $Al(NO_3)_3$(aq)-containing washwater from the mixer with the liquid fraction containing a relatively small amount of entrained or suspended solid material in a third primary sealed mixing reactor, and then subjecting the resulting liquid mixture to either: (i) a thermal treatment at a temperature sufficient to convert $Al(NO_3)_3$ in the mixture to $Al(OH)_3$; or (ii) contact with sufficient aqueous and/or solid ($NH_4)_2CO_3$, this causing precipitation of $Al(OH)_3$. (Step 9).

Other more specific exemplary embodiments are described in further detail below.

BRIEF DESCRIPTION OF THE DRAWINGS

The preferred embodiments of the invention will hereinafter be described in conjunction with the appended drawings provided to illustrate but not limit the invention, where any like designations denote like elements, and in which.

Like reference numerals refer to like parts throughout the several flowsheets of the drawings.

DETAILED DESCRIPTION OF THE DRAWINGS

Figure 1:
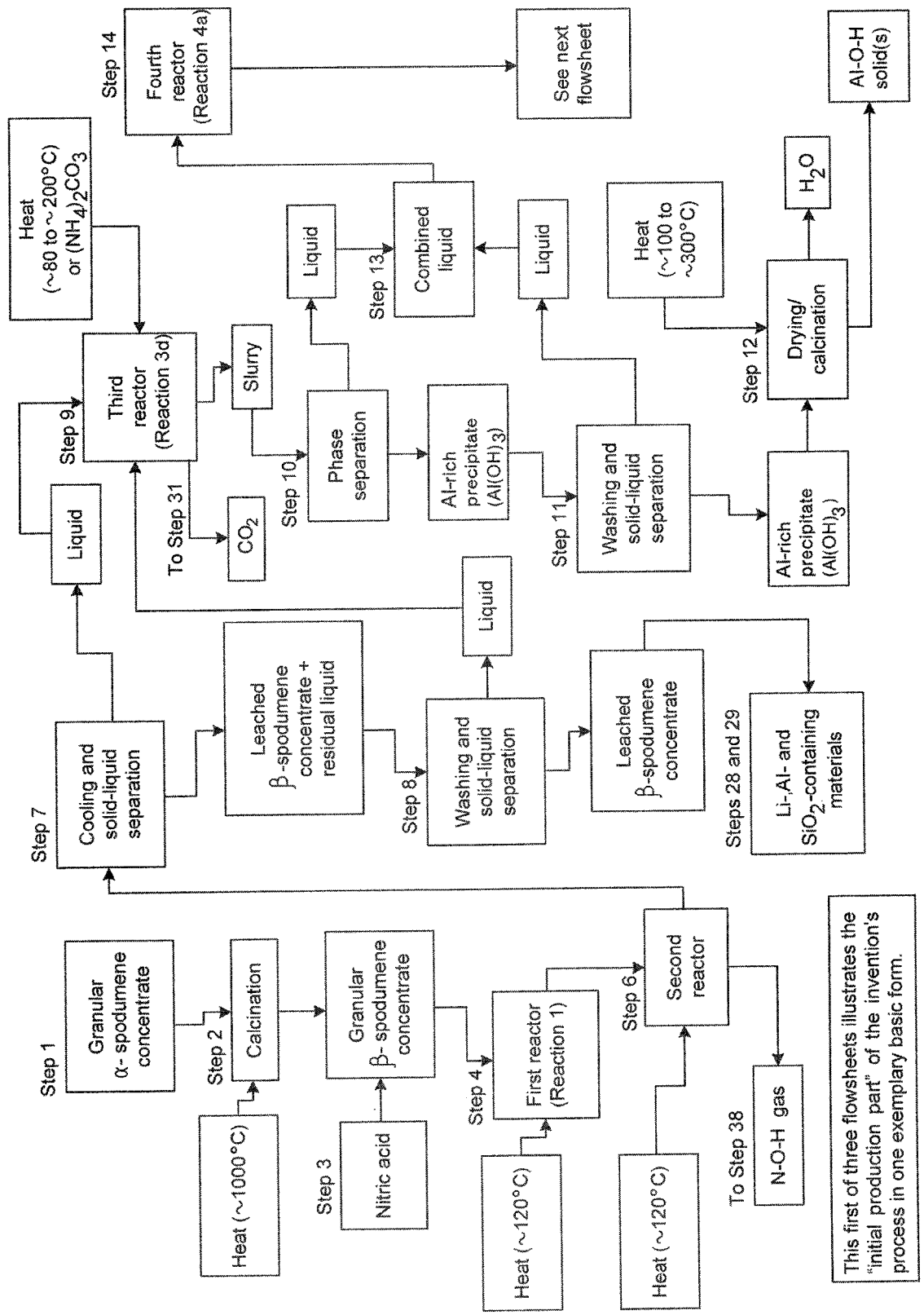
FIG. 1 presents a process flowsheet (block diagram) illustrating the "initial production part" of an exemplary process according to the present invention.
Figure 2:
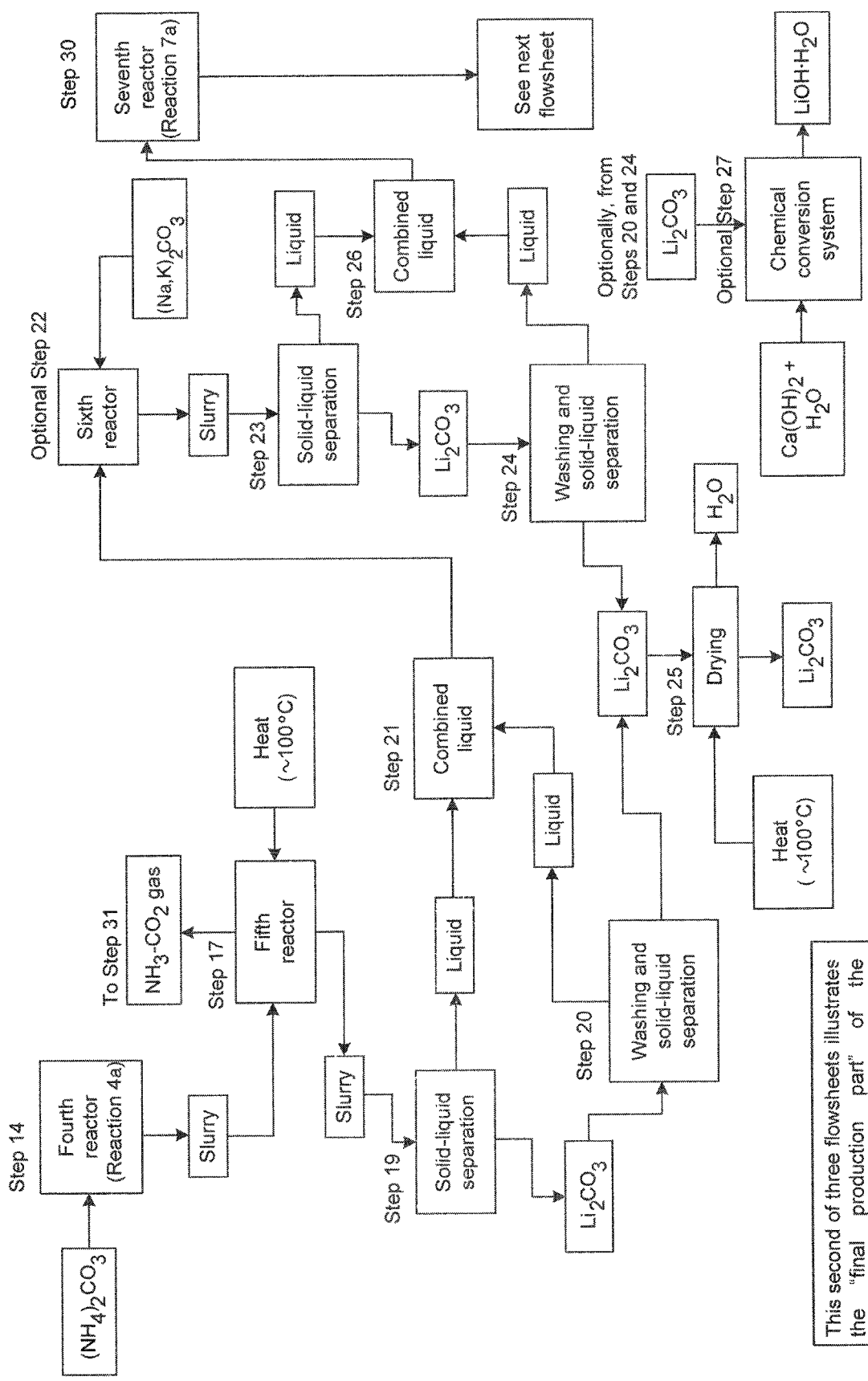
FIG. 2 presents a process flowsheet (a continuation of FIG. 1) illustrating the "final production part" of an exemplary process according to the present invention.
Figure 3:
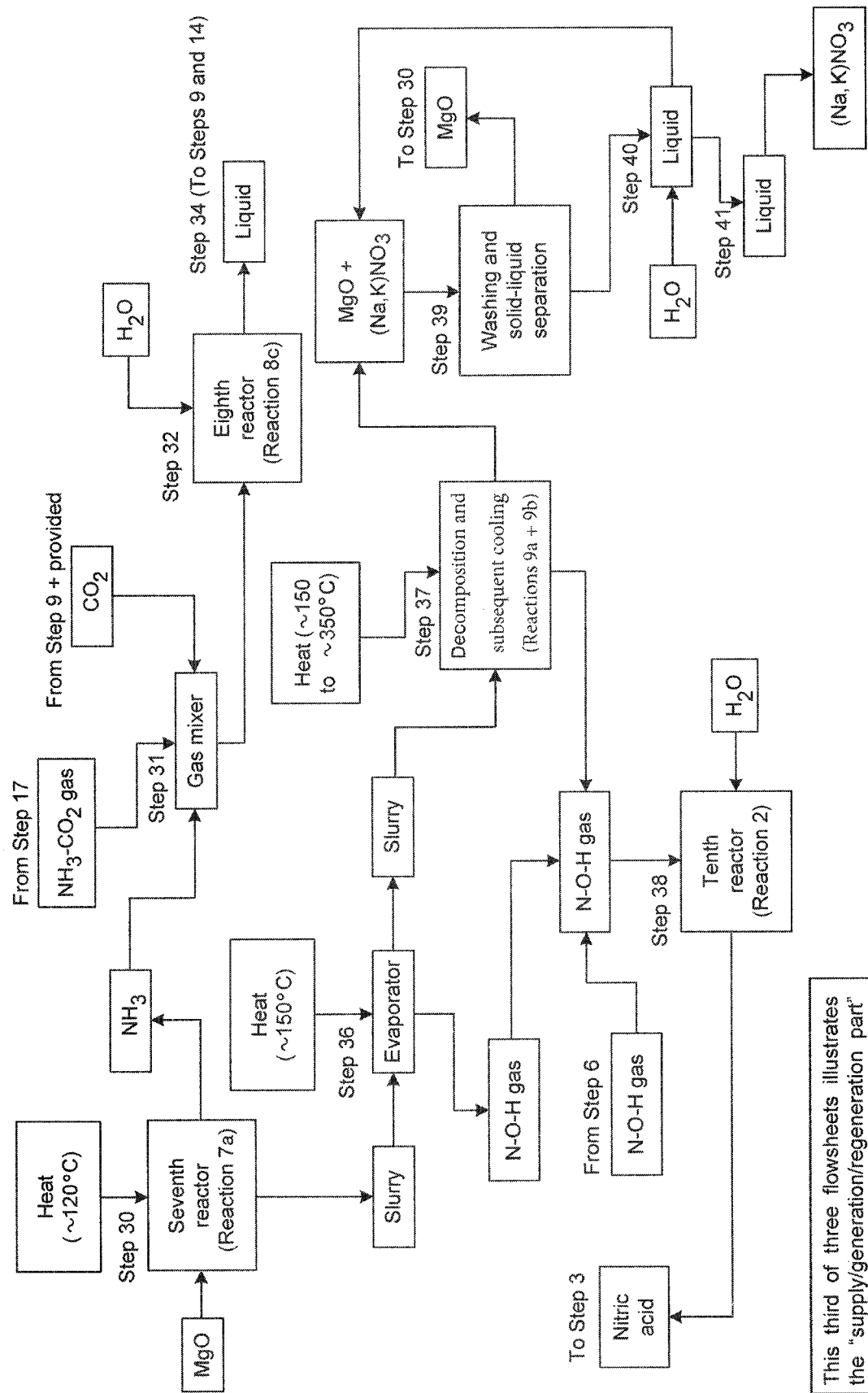
FIG. 3 presents a process flowsheet (a continuation of FIGS. 1 and 2) illustrating the "supply/generation/regeneration part" of an exemplary process according to the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make use of the embodiments of the disclosure and are not intended to limit the scope of the disclosure, which is defined by the claims.

Some features of the drawings may be described using designated numerical or relative sequential terms, such as "first," "second," and so forth. Such designated numerical or relative sequential terms are only for reference with respect to the appended figures and are not meant to limit the disclosed embodiments in terms of sequential order or exclude additional unrecited steps or process components at any point in the process, unless explicitly limited as such in the appended claims.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific amounts, dimensions, and/or other physical characteristics relating to the embodiments disclosed herein are not to be considered as limiting but merely exemplary, unless the claims expressly state otherwise.

Furthermore, a person skilled in the art would understand from reading this disclosure that "a" and "an" each generally denotes "at least one," but does not exclude a plurality unless the contextual use dictates otherwise. Also, the term "or" in a list of enumerated items denotes "at least one of the items" and therefore does not exclude a plurality of items in the list.

As described above, the idea underlying the invention pertains to extracting lithium, aluminum, and silica from a hard-rock source in the form of a granular concentrate of one or more lithium-containing aluminosilicate minerals, called a "spodumene concentrate." Spodumene is a mineral with the end-member (ideal, pure, theoretical, etc.) composition $LiAlSi_2O_6$. A spodumene concentrate is a granular mechanical mix of minerals created by crushing and grinding rock excavated from a spodumene pegmatite ore deposit, with the proportion of spodumene in the resulting granular solids enhanced by at least one concentration method, such as dense medium separation and froth flotation.

(Step 1): Typically, the first step in this processing method starts with a granular spodumene concentrate. Supplies of spodumene concentrate sold commercially are usually graded according to their $Li_2O$ content. Pure spodumene contains 8.03 weight percent (wt. %) $Li_2O$; a run-of-mine spodumene pegmatite ore ordinarily contains 1-2 wt. % $Li_2O$; a spodumene concentrate—the proportion of spodumene in it commonly being between 75 and 87% by weight, a requirement for use in $Li_2CO_3$ and/or $LiOH \cdot H_2O$ manufacturing—will typically contain 6-7 wt. % $Li_2O$. Spodumene concentrates containing at least 7.6 wt. % $Li_2O$, and having a low Fe content, are consumed in making ceramics, and in other specialty applications.

(Step 2): In one exemplary embodiment, the second step of the process involves calcining the granular spodumene concentrate provided in Step 1 at a temperature, or over a range of temperatures between about 900° C. and about 1,200° C., to convert the crystal structure of the spodumene from its most common natural form, the alpha (α) polymorph, to a synthetic beta (β) configuration.

(Step 3): Typically, the third step of the process involves the use of an aqueous solution of nitric acid ($HNO_3$(aq)). The solution would preferably contain between about 20 and about 68 wt. % $HNO_3$(aq), the balance being mostly high-purity water. Most preferably for commercial applications, the nitric acid would contain between about 40 and about 68 wt. % $HNO_3$(aq).

(Step 4): Typically, the fourth step involves taking the β-spodumene concentrate produced in Step 2 and mixing it into the nitric acid provided in Step 3—possibly at about $25 \leq T(° C.) \leq$ about 80 and at about $1 \leq P(atm) \leq$ about 10, plus optionally merging it with a compressed $NO_2$—$O_2 \pm H_2O \pm HNO_3$ (N—O—H) gas-prior to, during, and/or after material transfer to a first primary sealed mixing reactor. During this step, leaching of the granular β-spodumene commences, with some of the Li in the mineral, along with a portion of the Al in it, becoming dissolved in the acidic aqueous liquid. It is contemplated that the transfer of Li and Al from the grains of β-spodumene to the enclosing acidic aqueous liquid occurs by one or more chemical reactions similar to Reaction 1 below, with the calculated values above each species indicating the mass (in tonnes) that is expected to be consumed or produced during reaction.

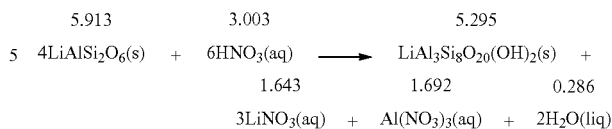

The acidic slurry ±N—O—H gas may then be heated to about 120° C. at about $1<P(atm) \leq$ about 10 during and after loading into the reactor. Heating to about 120° C. could be accomplished by flowing the slurry through pipes immersed in a heat transfer liquid temperature-regulated at about $120<T(° C.) \leq$ about 140. In addition, the flow path for the acidic slurry ±N—O—H gas might include a mixer having a spiked rotor spinning rapidly inside a housing of such construction that all of the acidic slurry ±N—O—H gas is forced to flow around the spikes during its travel from the anterior end of the mixer to its exit point. Preferably, as flow of material through the mixer occurs, the pressure and temperature of the entire amount of material would be maintained or allowed to increase slightly. A guiding principle in achieving satisfactory nitric acid Li—Al leaching of β-spodumene is that mixing would best be accomplished under physicochemical conditions that tend to sustain, or even increase, the wt. % concentration of $HNO_3$(aq) in the nitric acid, while at the same time precluding any significant loss of β-spodumene. For example, to mitigate the decrease in wt. % $HNO_3$(aq) that occurs during leaching of Li and Al from the β-spodumene, the starting wt. % concentration of $HNO_3$(aq) in the nitric acid might be in the range of about 50-68%, and the initial $HNO_3$(aq) to β-spodumene weight ratio might be set high enough to ensure that the wt. % concentration of $HNO_3$(aq) remains high throughout the period of Li—Al leaching. Additionally, or alternatively, the wt. % $HNO_3$(aq) in the nitric acid might be kept high by the N—O—H gas (if present), which would enable model Reaction 2 below.

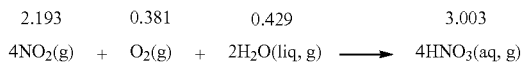

The net result of Reaction 2 is that depletion of $HNO_3$(aq) in the nitric acid by Reaction 1 is counteracted by replenishment of $HNO_3$(aq) in the acidic mixture due to Reaction 2. Finally, at the conclusion of this step the produced slurry would preferably contain about 30-70 volume percent (vol. %) solids.

(Optional Step 5): The fifth step of this process is optional and relates to the slurry formed in Step 4. This slurry may be transferred to one or more secondary sealed mixing reactors where further leaching of Li and Al from β-spodumene occurs by one or more reactions similar to Reaction 1. Bench-scale laboratory tests performed to date indicate that Steps 3 and 4±Step 5 will ultimately remove close to 90% of the Li, and between 15 and 30% of the Al, from calcined granular β-spodumene.

(Step 6): The sixth step of this process involves the slurry produced in Steps 3 and 4±Step 5 flowing out of the reactor, pumped, or driven by a pressure gradient, through equipment that enables gas pressure to be lowered to a level nearly equal to that in a second primary sealed mixing reactor, which receives that slurry. Gas pressure in the second primary sealed mixing reactor could be kept low (e.g., near 1 atm) by creating a headspace into which N—O—H gas can enter from the heated acidic slurry below, and from which N—O—H gas can be extracted through the side(s) and/or top of the headspace, to facilitate progressive degassing of the slurry. It is contemplated that the removed gas will include chemical species that will comprise $HNO_3$, $H_2O$, $NO_2$, and $O_2$—the total amount of them being abundant. It is further contemplated that, in commercial applications of the processing steps disclosed herein, the removed gas containing said N—O—H volatile species may subsequently be added to the N—O—H gas formed in Steps 36 and 37, the combined masses of gas thereafter being reacted (Step 38) to regenerate most of the nitric acid that is consumed during Step 4, or during both Steps 4 and 5.

(Step 7): The seventh step involves the slurry formed in Step 6 being removed from the second primary sealed mixing reactor and allowed to cool down to about $25 \leq T(°C.) \leq$ about 60 prior to being divided into two fractions, one rich in leached granular β-spodumene, the other a liquid containing very little entrained or suspended solid material. Subsequently, the liquid is transferred to a third primary sealed mixing reactor. Materials separation could be achieved by centrifugation and/or filtration. As shown above in Reaction 1, the liquid produced in this step will comprise substantial amounts of $LiNO_3(aq)$ and $Al(NO_3)_3(aq)$.

(Step 8): The eighth step of the process involves the substantially leached granular β-spodumene (accompanied by subordinate amounts of one or more of quartz, feldspar, mica, etc.) separated in Step 7 being sent to a mixer where it is washed in high-purity water, the resulting $LiNO_3(aq)$- and $Al(NO_3)_3(aq)$-containing washwater then being sent to the third primary sealed mixing reactor (Step 9). Preferably, the solids would be washed in a minimum amount of high-purity water, and optionally, the substantially leached β-spodumene could be treated as described in Steps 28 and 29 to produce additional Li- and Al-containing materials, along with a substantial amount of one or more $SiO_2$-containing materials.

(Two important notes: (i) Steps 9-13 below describe the present invention's technique for producing a Al-rich precipitate ("$Al(OH)_3$") from a $LiNO_3$—$Al(NO_3)_3$—$H_2O$— . . . liquid; and (ii) here and in the remainder of this disclosure, "- . . . " is used to indicate the possible presence of additional species in aqueous solution.)

Step 9—Ammonium Carbonate Treatment Option: In one embodiment, the ninth step involves a liquid comprising abundant $(NH_4)_2CO_3(aq)$ dissolved in high-purity water, and/or a mass of high-purity $(NH_4)_2CO_3(s)$, being provided and mixed with the liquid residing in the third primary sealed mixing reactor, the result being precipitation of $Al(OH)_3(s)$. Four model reactions that relate to the use of $(NH_4)_2CO_3(aq,s)$ to induce the precipitation of $Al(OH)_3(s)$ from a $LiNO_3$—$Al(NO_3)_3$—$H_2O$— . . . liquid are given below.

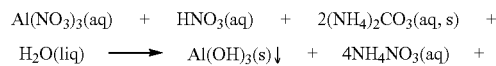

Reaction 3a $Al(NO_3)_3(aq) + HNO_3(aq) + 2(NH_4)_2CO_3(aq,s) + H_2O(liq) \longrightarrow Al(OH)_3(s)\downarrow + 4NH_4NO_3(aq) + 2CO_2(g)\uparrow$

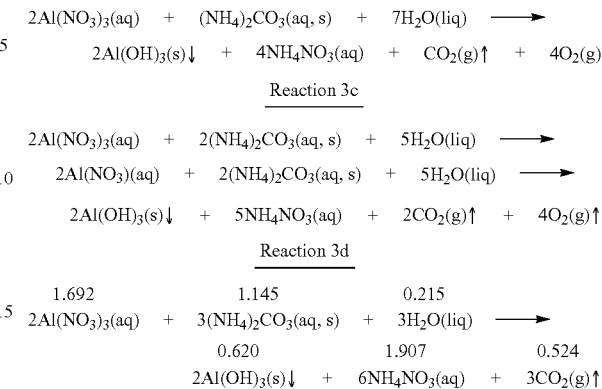

Reaction 3b $2Al(NO_3)_3(aq) + (NH_4)_2CO_3(aq,s) + 7H_2O(liq) \longrightarrow 2Al(OH)_3(s)\downarrow + 4NH_4NO_3(aq) + CO_2(g)\uparrow + 4O_2(g)$ Reaction 3c $2Al(NO_3)_3(aq) + 2(NH_4)_2CO_3(aq,s) + 5H_2O(liq) \longrightarrow$
$2Al(NO_3)(aq) + 2(NH_4)_2CO_3(aq,s) + 5H_2O(liq) \longrightarrow$
$2Al(OH)_3(s)\downarrow + 5NH_4NO_3(aq) + 2CO_2(g)\uparrow + 4O_2(g)\uparrow$ Reaction 3d $\underset{1.692}{2Al(NO_3)_3(aq)} + \underset{1.145}{3(NH_4)_2CO_3(aq,s)} + \underset{0.215}{3H_2O(liq)} \longrightarrow$
$\underset{0.620}{2Al(OH)_3(s)\downarrow} + \underset{1.907}{6NH_4NO_3(aq)} + \underset{0.524}{3CO_2(g)\uparrow}$ Preferably, precipitation would be induced at about $25 \leq T(°C.)$ about 60 and P=about 1 atm. To ensure optimal production of $Al(OH)_3(s)$: first, the amount of provided $(NH_4)_2CO_3$ (aq,s) should be close to the minimum amount required to remove all of the $Al(NO_3)_3(aq)$ in the liquid; and second, the produced $CO_2(g)$ should be removed from the reactor as it forms.

Alternative Step 9—Thermal Treatment Option: As an alternative to the ammonium carbonate treatment described in the preceding paragraph, it is possible (and sometimes preferred) to subject the mixture in the third primary sealed mixing reactor to a thermal treatment at a temperature sufficient to decompose $Al(NO_3)_3$ in the mixture to form $Al(OH)_3(s)$. The temperature for carrying out the thermal treatment option may be in the range of about 80 to about 200° C. In this option, Reactions 3a-3d are avoided and no high-purity $(NH_4)_2CO_3(aq,s)$ is contacted with $LiNO_3(aq)$ until such time that precipitation of $Al(OH)_3(s)$ is completed, and when it becomes time to precipitate $Li_2CO_3(s)$ by Reaction 4a and/or Reaction 4b.

(Step 10): The tenth step of the process involves the $Al(OH)_3(s)$- and $LiNO_3(aq)$-containing aqueous slurry formed in Step 9 being removed from the third primary sealed mixing reactor and divided into $Al(OH)_3(s)$-rich and liquid-rich fractions. Materials separation could be achieved by centrifugation and/or filtration.

(Step 11): The eleventh step of the process involves the precipitate separated in Step 10 being sent to a mixer where it is combined with high-purity water and stirred/agitated vigorously to produce a slurry that is subsequently divided into $Al(OH)_3(s)$-rich and liquid-rich fractions. Preferably, the slurry in the mixer would include about 40-70 vol. % solids. Separation of the $Al(OH)_3(s)$ and liquid after mixing could be achieved by centrifugation and/or filtration.

(Step 12): The twelfth step involves the moist $Al(OH)_3(s)$-rich solid material produced in Step 11 being heated to a temperature, or over a range of temperature, above about 100° C. to dehydrate the material, this possibly leading to the production of one or more forms of crystalline $Al(OH)_3(s)$ and/or $Al_2O_3(s)$.

(Step 13): In the thirteenth step, the liquids formed in Steps 10 and 11 are combined and sent to a fourth primary sealed mixing reactor, treatment options prior to entry into that reactor including (i) flow into and out of an evaporator where the concentrations of dissolved solids are increased due to removal of water, and (ii) use of compressed $NH_3$—$CO_2$ gas to pressurize the liquid to $1 < P(atm) \leq$ about 10.

(Important note: Steps 14-16 and 22 below describe four distinct means for converting $LiNO_3(aq)$ to high-purity $Li_2CO_3(s)$. Sufficient conversion might be achieved by use of just one of the methods, or alternatively, by two or more of them, e.g., as follows: (i) Steps 14 and 15, optionally followed by Step 22; and (ii) Step 16 followed by Step 22.)

(Step 14): The fourteenth step involves the liquid in the fourth primary sealed mixing reactor being merged with a liquid including abundant $(NH_4)_2CO_3(aq)$ dissolved in high-purity water, and/or high-purity $(NH_4)_2CO_3(s)$—the amount of $(NH_4)_2CO_3(aq,s)$ supplied being slightly in excess of that required to react away most of the $LiNO_3(aq)$. Precipitation of $Li_2CO_3(s)$ could occur principally by model Reaction 4a below.

Reaction 4a

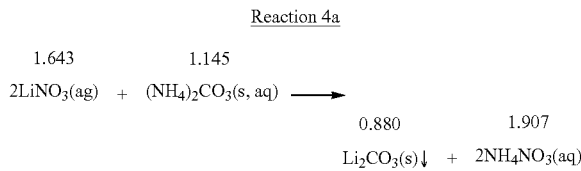

Reaction 4a would preferably be carried out at about $25 \leq T$ (° C.)≤about 80 and at about $1 \leq P$ (atm)≤about 10.

(Step 15): The fifteenth step can be an additional or alternative step. The liquid in the fourth primary sealed mixing reactor is merged with a mixed $NH_3$—$CO_2$ gas having a composition previously shown to be suitable for reaction with $LiNO_3(aq)$ to produce $Li_2CO_3(s)$, the amount of $NH_3$—$CO_2$ gas thus supplied being sufficient to, first, react away most of the $LiNO_3(aq)$, and second, form and leave behind an amount of $(NH_4)_2CO_3(aq)$. Precipitation of $Li_2CO_3(s)$ could occur mainly by model Reaction 4b below.

Reaction 4b $2LiNO_3(aq) + 2NH_3(g) + CO_2(g) + H_2O(liq) \rightarrow Li_2CO_3(s)\downarrow +$
$2NH_4NO_3(aq)$ Reaction 4b would preferably be carried out at about $25 \leq T$ (° C.)≤about 80 and about $1 \leq P$ (atm)≤about 10.

(Step 16): Alternatively, the sixteenth step involves the liquid in the fourth primary sealed mixing reactor being merged with any material or materials that result in both (i) co-production of $Li_2CO_3(s)$ and $NH_4NO_3(aq)$ and (ii) formation and retention of $(NH_4)_2CO_3(aq)$ at about $25 \leq T$(° C.)≤about 80 and at about $1 \leq P$(atm)≤about 10.

(Step 17): The seventeenth step involves the $Li_2CO_3(s)$-$LiNO_3(aq)$-$NH_4NO_3(aq)$-$(NH_4)_2CO_3(aq)$-$H_2O(liq)$- . . . slurry produced by one or more of Steps 14, 15, and 16, which is transferred to a fifth primary sealed mixing reactor where nearly all existing $(NH_4)_2CO_3(aq)$ is decomposed. Decomposition of $(NH_4)_2CO_3(aq)$ is likely to occur mainly according to the model decomposition reaction below.

Decomposition Reaction $(NH_4)_2CO_3(aq) \rightarrow 2NH_3(g)\uparrow + CO_2(g)\uparrow + H_2O(liq)$ This decomposition reaction would preferably be induced at about $60 \leq T$(° C.)≤about 120 and at P=about 1 atm to ensure maximum decomposition of $(NH_4)_2CO_3(aq)$. The produced $NH_3$—$CO_2$ gas should be removed from the reactor as it forms.

(Optional Step 18): Optionally, the eighteenth step involves the $NH_3$—$CO_2$ gas extracted from the fifth primary sealed mixing reactor (Step 17) to be compressed and stored temporarily in a pressure vessel.

(Step 19): The nineteenth step involves the $Li_2CO_3(s)$-$LiNO_3(aq)$-$NH_4NO_3(aq)$-$H_2O(liq)$- . . . slurry produced in Step 17 being removed from the fifth primary sealed mixing reactor and divided into $Li_2CO_3(s)$-rich and liquid-rich fractions. Materials separation could be achieved by centrifugation and/or filtration.

(Step 20): The twentieth step involves the moist $Li_2CO_3(s)$ separated in Step 19 being sent to a mixer where it is combined with high-purity water, and then stirred/agitated vigorously to produce a $Li_2CO_3(s)$-$LiNO_3(aq)$-$NH_4NO_3(aq)$-$H_2O(liq)$- . . . slurry that is subsequently divided into $Li_2CO_3(s)$-rich and liquid-rich fractions. Materials separation could be achieved by centrifugation and/or filtration.

(Step 21): The twenty-first step involves the $LiNO_3$—$NH_4NO_3$—$H_2O$— . . . liquids separated in Steps 19 and 20 being combined and sent to a sixth primary sealed mixing reactor, a treatment option prior to entry into that reactor being flow into and out of an evaporator where the concentrations of dissolved solids are increased due to removal of water.

(Important note: the purpose of Step 22 below is to react away nearly all of the $LiNO_3(aq)$ present in the sixth primary sealed mixing reactor, assuming enough of that species exists in the liquid (Step 21) to justify the use of $(Na,K)_2CO_3(aq,s)$ to achieve nearly complete conversion of $LiNO_3(aq)$ to $Li_2CO_3(s)$. For the sake of completeness in this document, it is stipulated that the latter circumstance obtains.)

(Step 22): The twenty-second step involves the $LiNO_3$—$NH_4NO_3$—$H_2O$— . . . liquid in the sixth primary sealed mixing reactor being (i) merged with a liquid in which the solid material dissolved in high-purity water is $(Na,K)_2CO_3(aq)$, and/or (ii) merged with high-purity $(Na,K)_2CO_3(s)$. Precipitation of $Li_2CO_3(s)$ could occur principally by the model reaction below.

Supplementary $Li_2CO_3$ Precipitation Reaction

Supplementary $Li_2CO_3$
Precipitation Reaction $2LiNO_3(aq) + (Na,K)_2CO_3(s,aq) \rightarrow Li_2CO_3(s)\downarrow + 2(Na,K)NO_3(aq)$ This precipitation reaction would preferably be induced at about $25 \leq T$(° C.)≤about 120 and P=about 1 atm.

(Step 23): The twenty-third step involves the $Li_2CO_3(s)$-$NH_4NO_3(aq)$-$(Na,K)NO_3(aq)$-$H_2O(liq)$- . . . slurry produced in Step 22 being removed from the sixth primary sealed mixing reactor and divided into $Li_2CO_3(s)$-rich and liquid-rich fractions. Materials separation could be achieved by centrifugation and/or filtration.

(Step 24): The twenty-fourth step involves the $Li_2CO_3(s)$ produced in Step 23 being sent to a mixer where it is combined with high-purity water, and then stirred/agitated vigorously to produce a $Li_2CO_3(s)$-$NH_4NO_3(aq)$-$(Na,K)NO_3(aq)$-$H_2O(liq)$- . . . slurry that is subsequently divided into $Li_2CO_3(s)$-rich and liquid-rich fractions. Preferably, the slurry in the mixer would include about 40-70 vol. % solids. Materials separation after mixing could be achieved by centrifugation and/or filtration.

(Step 25): The twenty-fifth step involves combining the moist $Li_2CO_3(s)$ produced in Steps 20 and 24, which can thereafter, optionally be further processed to remove impurities, and then heated to a temperature, or over a range of temperature, between about 80° C. and about 120° C. to thoroughly dry the material.

(Step 26): The twenty-sixth step involves the $NH_4NO_3$—$(Na,K)NO_3$—$H_2O$— . . . liquids separated in Steps 23 and 24 being combined and sent to a seventh primary sealed mixing reactor, a treatment option prior to entry into the reactor being flow into and out of an evaporator where the concentrations of dissolved solids are increased due to removal of water.

(Important note, Optional Step 27 shows that the process described herein is entirely amenable to reacting a β-spodumene concentrate to produce $LiOH·H_2O(s)$.)

(Optional Step 27): Optionally, the twenty-seventh step involves the moist high-purity $Li_2CO_3(s)$ produced in Steps 20 and 24 being converted to high-purity $LiOH·H_2O(s)$. Formation of $LiOH·H_2O(s)$ from $Li_2CO_3(s)$ can be achieved in several ways, a particularly well-known one being by the metathesis reaction (Reaction 5) below.

Reaction 5

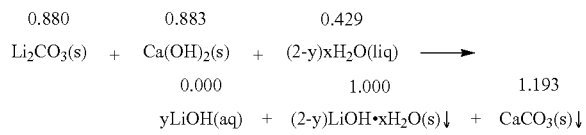

Reaction 5 would typically be followed by adjustment of the hydration state of the $LiOH·xH_2O(s)$ to produce $LiOH·H_2O(s)$.

(Important note: Steps 28 and 29 describe the production and recovery of Li-, Al-, $SiO_2$- and $Fe^{3+}$-containing materials from the substantially leached granular β-spodumene produced in Step 8.

(Step 28): The twenty-eighth step involves the substantially leached granular β-spodumene produced in Step 8 being reacted with aqueous Na—K hydroxide at about 25≤T(° C.)≤about 120 and at about 1≤P(atm)≤about 10 to dissolve the Li and Al, and the hitherto nearly insoluble $SiO_2$, included therein. Dissolution of leached granular β-spodumene in $(Na,K)OH(aq)$ could occur by one or more chemical reactions similar to Reaction 6 below.

Reaction 6

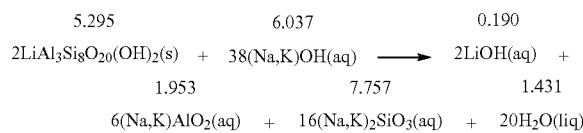

In this regard, it is noteworthy that the results of recent bench-scale laboratory tests indicate that the trace amount of Fe in nitric acid-leached granular β-spodumene is not dissolved by reaction with $(Na,K)OH(aq)$, but rather is oxidized to form highly water-insoluble (but possibly substantially hydrated) ferric iron ($Fe^{3+}$) oxide/hydroxide solid material. Thus, centrifugation and/or filtration could be used to separate the $Fe^{3+}$ oxide/hydroxide solid material from co-produced liquid (Reaction 6) prior to further processing, the latter being focused on separating out and recovering the Li-, Al- and $SiO_2$-containing material solubilized by Reaction 6.

(Step 29): The twenty-ninth step involves the Li, Al and $SiO_2$ solubilized in Step 28 being recovered as follows: (i) Li is separated as $Li_2CO_3(s)$ and/or $LiOH(aq)$ and/or $LiOH·xH_2O(s)$ (x=1, 2, 3, 6) and/or $Li_2O·xSiO_2$ (x=1, 2); (ii) Al is separated as $Al(OH)_3(s)$ and/or $Al_2O_3·H_2O$ and/or $Al_2O_3(s)$; and (iii) $SiO_2$ is either retained in $(Na,K)_2SiO_3(aq)$ and/or is separated as precipitated silica and/or silica gel.

(Important note: Steps 30-38 describe processing steps that supply, generate or regenerate various materials that are consumed in the process of the present invention.)

Generation of $NH_3(g)$, and co-production of a high-purity $Mg(NO_3)_2$—$H_2O$ liquid.

(Step 30): The thirtieth step involves the $NH_4NO_3$—$(Na,K)NO_3$—$H_2O$— . . . liquid in the seventh primary sealed mixing reactor being contacted with either (i) an excess amount of magnesium oxide, $MgO(s)$, or (ii) an excess amount of $MgO(s)$+magnesium hydroxide, $Mg(OH)_2(s)$, or (iii) an excess amount of $Mg(OH)_2(s)$, to produce aqueous magnesium nitrate, $Mg(NO_3)_2(aq)$, $H_2O(liq)$, and $NH_3(g)$. It is contemplated that $Mg(NO_3)_2(aq)$ and $NH_3(g)$ would be produced by all three of the Reactions 7a, 7b and 7c below if the $NH_4NO_3(aq)$ in the seventh primary sealed mixing reactor is reacted with $MgO(s)$ or $MgO(s)$+$Mg(OH)_2(s)$—or only by Reaction 7c if that $NH_4NO_3(aq)$ is, instead, reacted with solely $Mg(OH)_2(s)$.

Reaction 7a

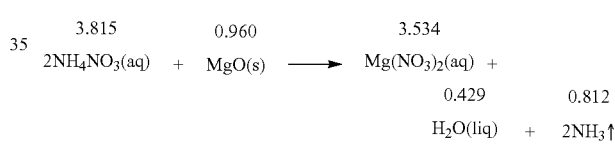

Reaction 7b

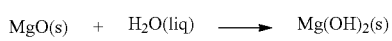

Reaction 7c

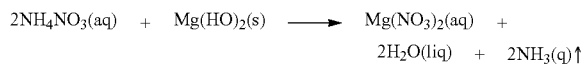

Regeneration of $(NH_4)_2CO_3(aq)$ and/or $(NH_4)_2CO_3(s)$.

(Step 31): The thirty-first step involves the combination of (i) the $CO_2(g)$ produced in Step 9, (ii) the $NH_3$—$CO_2$ gas produced in Step 17, (iii) the $NH_3(g)$ formed in Step 30, and (iv) provided $CO_2(g)$, in a gas mixer.

(Step 32): The thirty-second step involves the mixed gas produced in Step 31 being sent to an eighth primary sealed mixing reactor to produce a liquid in which the solid material dissolved in high-purity water is almost entirely $(NH_4)_2CO_3(aq)$. Synthesis of $(NH_4)_2CO_3(aq)$ can be achieved by inducing Reactions 8a and 8b, and/or Reaction 8c, set forth below. In any case, the final result is $(NH_4)_2CO_3(aq)$ dissolved in high-purity $H_2O(liq)$.

Reaction 8a

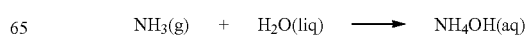

-continued

Reaction 8b

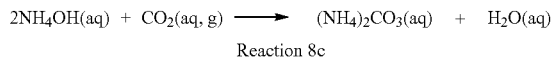

Reaction 8c

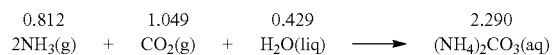

(Optional Step 33): Optionally, the thirty-third step involves water being removed from the $(NH_4)_2CO_3$—$H_2O$ liquid (Step 32) to precipitate, and subsequently separate, high-purity $(NH_4)_2CO_3(s)$.

(Step 34): The thirty-fourth step involves the high-purity $(NH_4)_2CO_3(aq)$ produced in Step 32, and/or the high-purity $(NH_4)_2CO_3(s)$ crystallized in Step 33, being sent back to one or both of Steps 9 and 14 to greatly reduce the net consumption of $(NH_4)_2CO_3(aq,s)$.

Reproduction/production of a mixed $NH_3$—$CO_2$ gas suitable for use in Step 15.

(Optional Step 35): Optionally, the thirty-fifth step involves the combination of (i) the $CO_2(g)$ produced in Step 9, (ii) the $NH_3$—$CO_2$ gas produced in Step 17, (iii) the $NH_3(g)$ formed in Step 30, and (iv) provided $CO_2(g)$, all being sent through a gas mixer to produce a mixed $NH_3$—$CO_2$ gas suitable for use in Step 15.

Regeneration of $HNO_3(aq,g)$.

(Step 36): The thirty-sixth step involves the slurry produced in Step 30 being removed from the seventh primary sealed mixing reactor and sent to an evaporator where most of the water in the liquid, plus a small amount of $HNO_3(aq)$ that forms in it, are separated. In this step, vacuum extraction could be used to reduce the time it takes to remove water.

(Step 37): The thirty-seventh step involves the partially dehydrated slurry produced in Step 36 being devolatilized, preferably at P=about 1 atm, and at a temperature, or over a range of temperature, above the upper thermal stability limits of both $Mg(OH)_2(s)$ and $Mg(NO_3)_2(liq)$, but below the upper thermal stability limit of $(Na,K)NO_3(liq)$. It is contemplated that the $Mg(OH)_2(s)+Mg(NO_3)_2(liq)$ would be heated to a temperature above about 330° C. where it is anticipated that decomposition would proceed by the model reactions below.

Reaction 9a

Reaction 9b

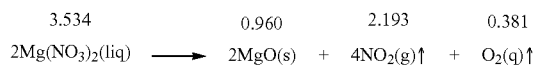

(Step 38): The thirty-eighth step involves the N—O—H gas produced in Steps 6, 36, and 37, along with a sufficient amount of $H_2O(liq)$, being sent to a tenth primary sealed mixing reactor wherein a substantial amount of $HNO_3$ could be produced by Reaction 2.

Steps 39-41 describe ways for recovering $(Na,K)NO_3(aq)$ and/or $(Na,K)NO_3(s)$.

(Step 39): The thirty-ninth step of the process involves the $MgO(s)+(Na,K)NO_3(s)$ produced in Step 37 being mixed into an undersaturated solution of $(Na,K)NO_3(aq)$ dissolved in high-purity water, the purpose being to solubilize the $(Na,K)NO_3(s)$ while at the same time minimizing conversion of $MgO(s)$ to $Mg(OH)_2(s)$. At the end of this step, the slurry is divided into $MgO(s)$-rich and liquid-rich fractions. Materials separation could be achieved by centrifugation and/or filtration.

(Step 40): The fortieth step involves the liquid produced in Step 39 being divided into two portions, here designated Portion 1 and Portion 2, and thereafter an amount of high-purity water approximately equal to Portion 2 is added to Portion 1.

(Optional Step 41): Optionally, the forty-first step involves water being removed from liquid Portion 2 (Step 40) to precipitate $(Na,K)NO_3(s)$.

(Important note: Steps 1-29 produce single masses of Li-, Al- and $SiO_2$-containing materials from a single mass of a granular concentrate of one or more lithium-containing aluminosilicate minerals, including spodumene (a "spodumene concentrate"), while Steps 30-38 show that most of the materials consumed in the processing can be regenerated in a straightforward way. In Step 42 below, Steps 1-29 and 30-41 are combined to allow either repeated batch, or mostly continuous, production of Li-, Al-, $SiO_2$- and $(Na,K)NO_3$-containing materials from a steady supply of spodumene concentrate, with the processing augmented by the creation of internal chemical cycles in which the consumed and regenerated amounts of key reactants can potentially be closely balanced. It should also be noted that the generation of $NH_3(g)$ (Step 30) and regeneration of $HNO_3(aq,g)$ (Steps 36-38) automatically involve near-mass-balanced internal consumption and reproduction of $MgO(s)$ and/or $Mg(OH)_2(s)$.

(Optional Step 42): Optionally, the forty-second step can be used to produce substantial amounts of Li-, Al-, $SiO_2$-, and $(Na,K)NO_3$-containing materials from a steady supply of provided spodumene concentrate as follows:

(i) The provided spodumene concentrate is (a) calcined as stipulated in Step 2, (b) cooled to less than about 100° C., and then (c) mixed into and reacted with nitric acid as described in Steps 4 and 5. The initial mass(es) of nitric acid required for Steps 4 and 5 is/are obtained entirely from one or more external sources (Step 3); amounts thereafter would come mostly from Steps 6 and 36-38.

(ii) $Al(OH)_3(s)$ is precipitated as discussed in Step 9, washed as described in Step 11, and finally dehydrated as explained in Step 12. If aqueous and/or solid $(NH_4)_2CO_3$ is used to precipitate $Al(OH)_3(s)$, the initial mass of the $(NH_4)_2CO_3$ necessary to ensure optimal production of $Al(OH)_3(s)$ is obtained entirely from one or more external sources; amounts thereafter would come mostly from (a) Steps 31 and 32 and/or (b) Steps 31-33.

(iii) $Li_2CO_3(s)$ is precipitated by one or more of the ways identified in Steps 14-16, and thereafter, possibly also by the technique described in Step 22. In Step 14, the initial mass of $(NH_4)_2CO_3(aq,s)$ is obtained entirely from one or more external sources; amounts thereafter would come mostly from (a) Steps 31 and 32 and/or (b) Steps 31-33. In Step 15, the initial mass of $NH_3$—$CO_2$ gas+$H_2O(liq)$ is obtained entirely from one or more external sources; amounts thereafter would come mostly from Step 31.

(iv) The $Li_2CO_3(s)$ formed in one or more of Steps 14-16, possibly followed by Step 22, is optionally converted to $LiOH·H_2O(s)$ as described in Step 27.

(v) Optionally, Steps 39-41 are used to recover amounts of (Na, K)$NO_3(aq)$ and/or (Na, K)$NO_3(s)$.

(vi) The moist $MgO(s)\pm Mg(OH)_2(s)$ produced in Step 39 is sent to Step 30 to substantially replace the $MgO(s)\pm Mg(OH)_2(s)$ consumed in that step.

(vii) Liquid Portion 1 (Step 40) is mixed into new amounts of the highly dehydrated MgO(s)+(Na,K)NO$_3$ (S) produced in Step 37.

Table 1 below shows the calculated tonnes of each species consumed (C) and produced (P) in each of Reactions 1, 2, 3d, 4a, 5, 6, 7a, 8c and 9b.

TABLE 1

| | Reaction | | | | | | | | | Tonnes consumed | Tonnes produced | Net tonnes consumed(−)/ produced(+) |
|---|---|---|---|---|---|---|---|---|---|---|---|---|
| Species | 1 | 2 | 3d | 4a | 5 | 6 | 7a | 8c | 9b | | | |
| LiAlSi$_2$O$_6$(s) | C | | | | | | | | | 5.913 | 0.0 | −5.913 |
| HNO$_3$(aq) | C | P | | | | | | | | 3.003 | 3.003 | 0.0 |
| LiAl$_3$Si$_8$O$_{20}$(OH)$_2$(s) | P | | | | | C | | | | 5.295 | 5.295 | 0.0 |
| LiNO$_3$(aq) | P | | | C | | | | | | 1.643 | 1.643 | 0.0 |
| Al(NO$_3$)$_3$(aq) | P | | C | | | | | | | 1.692 | 1.692 | 0.0 |
| H$_2$O(liq) | P | C | C | | C | P | P | C | | 1.502 | 2.149 | +0.647 |
| NO$_2$(g) | | C | | | | | | | P | 2.193 | 2.193 | 0.0 |
| O$_2$(g) | | C | | | | | | | P | 0.381 | 0.381 | 0.0 |
| (NH$_4$)$_2$CO$_3$(aq, s) | | | C | C | | | | P | | 2.290 | 2.290 | 0.0 |
| Al(OH)$_3$(s) | | | P | | | | | | | 0.0 | 0.620 | +0.620 |
| NH$_4$NO$_3$(aq) | | | P | P | | | C | | | 3.814 | 3.814 | 0.0 |
| CO$_2$(g) | | | P | | | | | C | | 1.049 | 0.524 | −0.525 |
| Li$_2$CO$_3$(s) | | | | P | C | | | | | 0.880 | 0.880 | 0.0 |
| Ca(OH)$_2$(s) | | | | | C | | | | | 0.883 | 0.0 | −0.883 |
| LiOH•H$_2$O(s) | | | | | P | | | | | 0.0 | 1.000 | +1.000 |
| CaCO$_3$(s) | | | | | P | | | | | 0.0 | 1.193 | +1.193 |
| NaOH(aq) | | | | | | C | | | | 6.037 | 0.0 | −6.037 |
| LiOH(aq) | | | | | | P | | | | 0.0 | 0.190 | +0.190 |
| NaAlO$_2$(aq) | | | | | | P | | | | 0.0 | 1.953 | +1.953 |
| Na$_2$SiO$_3$(aq) | | | | | | P | | | | 0.0 | 7.757 | +7.757 |
| MgO(s) | | | | | | | C | | P | 0.960 | 0.960 | 0.0 |
| Mg(NO$_3$)$_2$(aq) | | | | | | | P | | C | 3.534 | 3.534 | 0.0 |
| NH$_3$(g) | | | | | | | P | C | | 0.812 | 0.812 | 0.0 |

Table 2 below shows the calculated total amounts (tonnes) of the reactants and reaction products, mass balanced, for each of Reactions 1, 2, 3d, 4a, 5, 6, 7a, 8c and 9b.

TABLE 2

| Reaction | Total tonnes, reactants | Total tonnes, reaction products | Net tonnes consumed(−)/ produced(+) |
|---|---|---|---|
| 1 | 8.916 | 8.916 | 0.0 |
| 2 | 3.003 | 3.003 | 0.0 |
| 3d | 3.051 | 3.051 | 0.0 |
| 4a | 2.788 | 2.788 | 0.0 |
| 5 | 2.193 | 2.193 | 0.0 |
| 6 | 11.331 | 11.331 | 0.0 |
| 7a | 4.775 | 4.775 | 0.0 |
| 8c | 2.290 | 2.290 | 0.0 |
| 9b | 3.534 | 3.534 | 0.0 |

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of coverage of the invention should be determined by the appended claims and their legal equivalents.

What is claimed is:

1. A process for extracting lithium, aluminum, and silicon materials from lithium-containing aluminosilicate minerals, including spodumene, ~LiAlSi$_2$O$_6$, comprising at least the steps of:

providing a hard-rock source in the form of a granular concentrate of one or more lithium-containing aluminosilicate minerals, including spodumene (Step 1);

calcining the concentrate at an elevated temperature sufficient to convert substantially all of the spodumene therein from its natural alpha (α) polymorphic crystal structure to a synthetic beta (β) crystal structure (Step 2);

providing an aqueous solution of nitric acid (HNO$_3$) (Step 3);

mixing the calcined concentrate with the aqueous solution of nitric acid, and then subjecting the resulting mixture to conditions sufficient to effect leaching of lithium (Li) and aluminum (Al) from the calcined concentrate in a first primary reactor (Step 4) and, optionally, further reacting the concentrate with nitric acid in one or more secondary reactor(s), to form a slurry (optional Step 5);

transferring the slurry from the first primary reactor, or from the one or more optional secondary reactors, to a second primary reactor with a lower gas pressure to reduce the pressure of the transferred slurry (Step 6);

removing the slurry from the second primary reactor and allowing the slurry to cool down (Step 7);

separating the cooled slurry into two fractions, where one fraction contains leached granular β-spodumene, and the other fraction is a LiNO$_3$(aq)- and Al(NO$_3$)$_3$(aq)-containing liquid, the leached granular β-spodumene-containing fraction being transferred to a mixer where it is washed with water, separated from that washwater, and then, optionally, contacted with an aqueous solution of Na and/or K hydroxide under conditions sufficient to dissolve Li, Al, and SiO$_2$, and then subjected to recovery of: (i) Li as one or more of Li$_2$CO$_3$, LiOH(aq), LiOH·xH$_2$O (where x=1, 2, 3, or 6), and/or Li$_2$O·ySiO$_2$ (where y=1 or 2); (ii) Al as one or more of Al(OH)$_3$, Al$_2$O$_3$·H$_2$O, and/or Al$_2$O$_3$; and (iii) SiO$_2$ as either retained in (Na,K)$_2$SiO$_3$(aq) and/or as precipitated silica and/or as precipitated silica gel (Step 8); and combining the LiNO$_3$(aq)- and Al(NO$_3$)$_3$(aq)-containing washwater from the mixer with the LiNO$_3$(aq)- and Al(NO$_3$)$_3$(aq)-containing liquid fraction in a third primary reactor, and then subjecting the resulting liquid mixture to one of two treatments to induce precipitation of "Al(OH)$_3$(s)," either (i) a thermal treatment at a temperature sufficient to decompose the Al(NO$_3$)$_3$(aq) in the liquid mixture, or (ii) "a (NH$_4$)$_2$CO$_3$ treatment" that involves bringing the LiNO$_3$(aq)- and Al(NO$_3$)$_3$(aq)-containing liquid mixture into contact with (NH$_4$)$_2$CO$_3$(aq) and/or (NH$_4$)$_2$CO$_3$(s) (Step 9).

2. The process according to claim 1, further comprising removing the mixture from the third primary reactor and separating the mixture into two fractions, an Al(OH)$_3$(s)-rich fraction and a liquid-rich fraction (Step 10).

3. The process according to claim 2, further comprising sending the Al(OH)$_3$(s) separated in Step 10 to a mixer, where it is combined with water and stirred/agitated vigorously to produce a slurry that is subsequently divided into Al(OH)$_3$(s)-rich and liquid-rich fractions, the slurry in the mixer containing about 40-70 vol. % solids (Step 11).

4. The process according to claim 3, further comprising heating the moist Al(OH)$_3$(s)-rich solid material produced in Step 11 to a temperature, or over a range of temperature, above about 100° C. to dehydrate the material and produce one or more forms of well-crystallized Al(OH)$_3$(s) and/or Al$_2$O$_3$(s) (Step 12).

5. The process according to claim 4, further comprising combining the liquids separated in Steps 10 and 11 and sending the combined liquids to a fourth primary reactor, wherein treatment options prior to entry into the fourth primary reactor include (i) flow into and out of an evaporator where the concentrations of dissolved solids are increased due to removal of water, and (ii) compression of the liquid to $1 < P(atm) \leq$ about 10 (Step 13).

6. The process according to claim 5, further comprising: (a) merging the liquid in the fourth primary reactor either with a liquid composed almost entirely of (NH$_4$)$_2$CO$_3$(aq) dissolved in water, and/or with (NH$_4$)$_2$CO$_3$(s), the amount of (NH$_4$)$_2$CO$_3$(aq,s) thus supplied being slightly in excess of that required to react away most of the LiNO$_3$(aq) (Step 14); and/or (b) merging the liquid in the fourth primary reactor with a mixed NH$_3$—CO$_2$ gas having a composition suitable for reaction with LiNO$_3$(aq) to produce Li$_2$CO$_3$(s), wherein the amount of NH$_3$—CO$_2$ gas supplied is sufficient to react away most of the LiNO$_3$(aq) (Step 15); and/or (c) merging the liquid in the fourth primary reactor with any material or materials that result in both (i) co-production of Li$_2$CO$_3$(s) and NH$_4$NO$_3$(aq) and (ii) formation and retention of (NH$_4$)$_2$CO$_3$(aq), at about $25 \leq T(° C.) \leq$ about 80 and about $1 \leq P(atm) \leq$ about 10 (Step 16).

7. The process according to claim 6, further comprising subjecting the (NH$_4$)$_2$CO$_3$(aq) in the slurry produced by one or more of Steps 14, 15, and 16 to a thermal treatment after transfer to a fifth primary reactor, the result being decomposition of nearly all of the existing (NH$_4$)$_2$CO$_3$(aq) (Step 17).

8. The process according to claim 7, further comprising separating a Li$_2$CO$_3$(s)-LiNO$_3$(aq)-NH$_4$NO$_3$(aq)-H$_2$O(liq)- . . . slurry produced in Step 17 into Li$_2$CO$_3$(s)-rich and LiNO$_3$—NH$_4$NO$_3$—H$_2$O(liq)- . . . liquid-rich fractions (Step 19).

9. The process according to claim 8, further comprising sending the moist Li$_2$CO$_3$(s)-rich fraction separated in Step 19 to a mixer, where it is combined with water and then stirred/agitated vigorously to produce a slurry that is subsequently divided into moist Li$_2$CO$_3$(s)-rich and LiNO$_3$—NH$_4$NO$_3$—H$_2$O(liq)- . . . liquid-rich fractions (Step 20).

10. The process according to claim 9, further comprising combining the two LiNO$_3$—NH$_4$NO$_3$—H$_2$O(liq)- . . . liquid-rich fractions separated in Steps 19 and 20 and sending the combined liquids to a sixth primary reactor, wherein a treatment option prior to entry into that reactor is flow into and out of an evaporator where the concentrations of dissolved solids are increased due to removal of water (Step 21).

11. The process according to claim 10, further comprising merging the combined LiNO$_3$—NH$_4$NO$_3$—H$_2$O(liq)- . . . liquid-rich fractions in the sixth primary reactor either with a liquid composed almost entirely of (Na,K)$_2$CO$_3$(aq) dissolved in water, and/or with Na$_2$CO$_3$(s) and/or with K$_2$CO$_3$(s), to cause precipitation of Li$_2$CO$_3$(s) (Step 22).

12. The process according to claim 11, further comprising removing Li$_2$CO$_3$(s)-NH$_4$NO$_3$(aq)-(Na,K)NO$_3$(aq)H$_2$O(liq)- . . . slurry produced in Step 22 from the sixth primary reactor and then separating the slurry into Li$_2$CO$_3$(s)-rich and NH$_4$NO$_3$(aq)-(Na,K)NO$_3$(aq)H$_2$O(liq)- . . . liquid-rich fractions (Step 23).

13. The process according to claim 12, further comprising sending the Li$_2$CO$_3$(s) produced in Step 23 to a mixer where it is combined with water, and then stirred/agitated vigorously to produce a slurry that is subsequently divided into moist Li$_2$CO$_3$(s)-rich and NH$_4$NO$_3$(aq)-(Na,K)NO$_3$(aq)H$_2$O(liq)- . . . liquid-rich fractions (Step 24).

14. The process according to claim 13, further comprising drying the moist Li$_2$CO$_3$(s) produced in Steps 20 and 24 by heating, after optional removal of impurities, to a temperature, or over a range of temperature, between about 80° C. and about 120° ° C. to thoroughly dry the material (Step 25).

15. The process according to claim 14, further comprising combining the NH$_4$NO$_3$—(Na,K)NO$_3$—H$_2$O— . . . liquids separated in Steps 23 and 24 and sending the combined liquids to a seventh primary reactor, a treatment option prior to entry into the reactor being flow into and out of an evaporator where the concentrations of dissolved solids are increased due to removal of water (Step 26).

16. The process according to claim 15, further comprising converting the moist Li$_2$CO$_3$(s) fractions produced in Steps 20 and 24 to LiOH·H$_2$O(s) by the metathesis reaction, Li$_2$CO$_3$(s)+Ca(OH)$_2$(s)+(2−y)xH$_2$O(liq)→yLiOH(aq)+(2−y)LiOH·xH$_2$O(s)↓+CaCO$_3$(s)↓, and, when necessary, it being followed by adjustment of the hydration state of the LiOH·xH$_2$O(s) to produce LiOH·H$_2$O(s) (step 27).

17. The process according to claim 16, further optionally comprising reacting the substantially leached granular β-spodumene produced in Step 8 with aqueous Na and/or K hydroxide at about $25 \leq T(° C.) \leq$ about 120 and about $1 \leq P(atm) \leq$ about 10 to dissolve the Li and Al, and the previously nearly insoluble SiO$_2$, contained therein (Step 28).

18. The process according to claim 17, further comprising recovering the Li, Al and SiO$_2$ solubilized in Step 28 as follows: (i) Li is recovered as Li$_2$CO$_3$(s) and/or LiOH(aq) and/or LiOH·xH$_2$O(s) (x=1, 2, 3, 6) and/or Li$_2$O·xSiO$_2$ (x=1, 2); (ii) Al is recovered as Al(OH)$_3$(s) and/or Al$_2$O$_3$·H$_2$O and/or Al$_2$O$_3$(s); and (iii) SiO$_2$ is either retained in (Na,K)$_2$SiO$_3$(aq) and/or is recovered as precipitated silica and/or as precipitated silica gel (Step 29).

19. The process according to claim 18, further comprising contacting the NH$_4$NO$_3$—(Na,K)NO$_3$—H$_2$O— . . . liquid in the seventh primary reactor with either (i) an excess amount of solid magnesium oxide, MgO(s), or (ii) an excess amount of MgO(s)+solid magnesium hydroxide, Mg(OH)$_2$(s), or (iii) an excess amount of Mg(OH)$_2$(s), to produce aqueous magnesium nitrate, $Mg(NO_3)_2(aq)$, $H_2O(liq)$, and $NH_3(g)$, wherein $Mg(NO_3)_2(aq)$ and $NH_3(g)$ are produced by all three of the different types of contacts if $NH_4NO_3(aq)$ is reacted with $MgO(s)$ or $MgO(s)+Mg(OH)_2(s)$—or only by the third type of contact if $NH_4NO_3(aq)$ is, instead, reacted with solely $Mg(OH)_2(s)$ (Step 30).

20. The process according to claim 19, further comprising combining (i) $CO_2(g)$ produced in Step 9, (ii) $NH_3$—$CO_2$ gas produced in Step 17, (iii) $NH_3(g)$ formed in Step 30, and (iv) provided $CO_2(g)$, in a gas mixer (Step 31).

21. The process according to claim 20, further comprising sending the mixed gas produced in Step 31 to an eighth primary reactor to produce a liquid composed almost entirely of $(NH_4)_2CO_3(aq)$ dissolved in water (Step 32), wherein water is optionally removed from the $(NH_4)_2CO_3$—$H_2O$ liquid produced in Step 32 to precipitate, and subsequently separate, $(NH_4)_2CO_3(s)$ (Step 33).

22. The process according to claim 21, further comprising recycling the $(NH_4)_2CO_3$—$H_2O$ liquid produced in Step 32 and/or the $(NH_4)_2CO_3(s)$ crystallized in Step 33 to one or both of Steps 9 and 14 to reduce the net consumption of $(NH_4)_2CO_3(aq,s)$ (Step 34).

23. The process according to claim 22, further comprising combining (i) the $CO_2(g)$ produced in Step 9, (ii) the $NH_3$—$CO_2$ gas produced in Step 17, (iii) the $NH_3(g)$ formed in Step 30, and (iv) provided $CO_2(g)$, in a gas mixer to produce a mixed $NH_3$—$CO_2$ gas suitable for use in Step 15 (Step 35).

24. The process according to claim 23, further comprising removing the $Mg(OH)_2(s)$-$Mg(NO_3)_2(aq)$-$(Na,K)NO_3(aq)$-$H_2O(liq)$-... slurry produced in Step 30 from the seventh primary reactor and sending the slurry to an evaporator where most of the water in the liquid, plus $HNO_3(aq)$ that forms in it, are separated, the evaporation time being optionally reduced by vacuum extraction (Step 36).

25. The process according to claim 24, further comprising additional water removal from the partially dehydrated slurry produced in Step 36, and subsequently devolatilizing it at a P of about 1 atm, and at a temperature, or over a range of temperature, above the upper thermal stability limits of both $Mg(OH)_2(s)$ and $Mg(NO_3)_2(liq)$ (Step 37).

26. The process according to claim 25, further comprising sending $HNO_3$, $H_2O$, $NO_2$, and $O_2$ gas species produced in each of Steps 6 and 36, and $H_2O$ (Reaction 9a) and $NO_2$ and $O_2$ (Reaction 9b) gas species produced in Step 37, along with a sufficient amount of $H_2O(liq)$, to a tenth primary reactor where nitric acid is formed (Step 38).

27. The process according to claim 26, further comprising mixing the highly dehydrated $MgO(s)+(NaNO_3(s)$ and/or $KNO_3(s))$ produced in Step 37 into an undersaturated solution of $(Na,K)NO_3(aq)$ dissolved in water to solubilize the $(NaNO_3(s)$ and/or $KNO_3(s))$ while at the same time minimizing conversion of $MgO(s)$ to $Mg(OH)_2(s)$, wherein the slurry is then divided into $MgO(s)$-rich and liquid-rich fractions (Step 39).

28. The process according to claim 27, further comprising dividing the liquid produced in Step 39 into two portions, Portion 1 and Portion 2, and thereafter adding an amount of water approximately equal to Portion 2 to Portion 1 (Step 40).

29. The process according to claim 28, further comprising removing the water from liquid Portion 2 (Step 40) to precipitate ($NaNO_3(s)$ and/or $KNO_3(s)$) (Step 41).

30. The process according to claim 29, further comprising producing Li-, Al-, $SiO_2$-, and ($NaNO_3(s)$ and/or $KNO_3(s)$)-containing materials from a hard-rock source in the form of a steady supply of a granular concentrate of one or more lithium-containing aluminosilicate minerals, including spodumene, as follows:

(i) The provided granular spodumene-containing concentrate is (a) calcined as stipulated in Step 2, (b) cooled to <100° C., and then (c) mixed into and reacted with nitric acid as described in Steps 4 and 5, the initial mass(es) of nitric acid required for Steps 4 and 5 being obtained entirely from one or more external sources (Step 3) with amounts thereafter coming mostly from Steps 6 and 36-38;

(ii) $Al(OH)_3(s)$ is precipitated as recited in Step 9, washed as described in Step 11, and finally dehydrated as recited in Step 12, wherein, in the case of the $(NH_4)_2CO_3$ treatment option in Step 9, the initial mass of $(NH_4)_2CO_3(aq,s)$ necessary to ensure optimal production of $Al(OH)_3(s)$ is obtained entirely from one or more external sources and amounts thereafter would come mostly from (a) Steps 31 and 32 and/or (b) Steps 31-33;

(iii) $Li_2CO_3(s)$ is precipitated by one or more of the ways identified in Steps 14-16, and thereafter, optionally also by the technique recited in Step 22, wherein in Step 14 the initial mass of $(NH_4)_2CO_3(aq,s)$ is obtained entirely from one or more external sources and amounts thereafter would come mostly from (a) Steps 31 and 32 and/or (b) Steps 31-33, and in Step 15 the initial mass of $NH_3$—$CO_2$ gas+$H_2O(liq)$ is obtained entirely from one or more external sources and amounts thereafter would come mostly from Step 31, plus $H_2O(liq)$ sourced from other step(s) of the process;

(iv) The $Li_2CO_3(s)$ formed in one or more of Steps 14-16, optionally followed by Step 22, is optionally converted to $LiOH·H_2O(s)$ as described in Step 27;

(v) Optionally, Steps 39-41 are used to recover additional amounts of $(Na, K)NO_3(aq)$ and/or ($NaNO_3(s)$ and/or $KNO_3(s)$);

(vi) The moist $MgO(s)±Mg(OH)_2(s)$ produced in Step 39 is sent to Step 30 to substantially replace the $MgO(s)$ $±Mg(OH)_2(s)$ consumed in that step;

(vii) Liquid Portion 1 (Step 40) is mixed into new amounts of the highly dehydrated $MgO(s)+(Na,K)NO_3(s)$ produced in Step 37 (Step 42).

31. The process according to claim 1, wherein the washed and separated leached granular β-spodumene-containing fraction is contacted with an aqueous solution of Na and/or K hydroxide under conditions sufficient to dissolve Li, Al, and $SiO_2$, and then subjected to recovery of: (i) Li as one or more of $Li_2CO_3$, $LiOH(aq)$, $LiOH·xH_2O$ (where x=1, 2, 3, or 6), and/or $Li_2O·ySiO_2$ (where y=1 or 2); (ii) Al as one or more of $Al(OH)_3$, $Al_2O_3·H_2O$, and/or $Al_2O_3$; and (iii) $SiO_2$ as either retained in $(Na,K)_2SiO_3(aq)$ and/or as precipitated silica and/or silica gel.

* * * * *